US009636637B2

(12) United States Patent
Earhart et al.

(10) Patent No.: US 9,636,637 B2
(45) Date of Patent: May 2, 2017

(54) PERMEATE CARRIER FABRIC FOR MEMBRANE FILTERS

(71) Applicant: Glen Raven, Inc., Glen Raven, NC (US)

(72) Inventors: Robert Charles Earhart, Mebane, NC (US); Monty Hodges, Florence, SC (US)

(73) Assignee: Glen Raven, Inc., Glen Raven, NC (US)

( * ) Notice: Subject to any disclaimer, the term of this patent is extended or adjusted under 35 U.S.C. 154(b) by 467 days.

(21) Appl. No.: 14/069,778

(22) Filed: Nov. 1, 2013

(65) Prior Publication Data

US 2014/0091030 A1    Apr. 3, 2014

Related U.S. Application Data

(63) Continuation-in-part of application No. 13/495,505, filed on Jun. 13, 2012, now abandoned.

(51) Int. Cl.
| | | |
|---|---|---|
| *D04B 21/16* | (2006.01) | |
| *B01D 69/10* | (2006.01) | |
| *B32B 5/24* | (2006.01) | |

(52) U.S. Cl.
CPC ............... *B01D 69/10* (2013.01); *B32B 5/24* (2013.01); *D04B 21/16* (2013.01); *B32B 2262/0276* (2013.01); *D10B 2505/04* (2013.01); *Y10T 442/425* (2015.04)

(58) Field of Classification Search
None
See application file for complete search history.

(56) References Cited

U.S. PATENT DOCUMENTS

| | | | |
|---|---|---|---|
| 3,791,178 A * | 2/1974 | Meyer | 66/196 |
| 4,454,176 A | 6/1984 | Buckfelder et al. | |
| 4,613,436 A | 9/1986 | Wight et al. | |
| 4,749,483 A | 6/1988 | Spet | |
| 4,769,263 A | 9/1988 | Bitter | |
| 4,855,058 A | 8/1989 | Holland et al. | |
| 4,906,372 A | 3/1990 | Hopkins | |
| 5,652,057 A | 7/1997 | Delker | |
| 5,855,991 A | 1/1999 | McLarty, III | |
| 5,948,020 A | 9/1999 | Yoon et al. | |
| 6,277,282 B1 * | 8/2001 | Kihara et al. | 210/652 |
| 6,454,942 B1 | 9/2002 | Shintani et al. | |
| 6,599,849 B1 | 7/2003 | Vogt et al. | |
| 6,638,284 B1 | 10/2003 | Rousseau et al. | |
| 6,767,498 B1 | 7/2004 | Talley et al. | |
| 7,048,855 B2 | 5/2006 | de la Cruz | |
| 7,083,644 B1 | 8/2006 | Moroni | |
| 2002/0127936 A1 | 9/2002 | Wildeman | |
| 2003/0034294 A1 | 2/2003 | Dutton et al. | |
| 2004/0214984 A1 * | 10/2004 | Keep et al. | 528/359 |
| 2005/0123750 A1 * | 6/2005 | Hodge et al. | 428/364 |
| 2008/0164208 A1 | 7/2008 | Doyen et al. | |
| 2009/0139650 A1 | 6/2009 | Hardwicke et al. | |
| 2009/0145838 A1 | 6/2009 | Knappe et al. | |
| 2010/0051132 A1 * | 3/2010 | Glenn | 139/387 R |

FOREIGN PATENT DOCUMENTS

| | | |
|---|---|---|
| CN | 1270101 | 10/2000 |
| EP | 1775364 A1 * | 4/2007 |
| EP | 1903134 | 3/2008 |
| WO | 2005070524 | 8/2005 |
| WO | 2010044971 | 4/2010 |

OTHER PUBLICATIONS

Official Action for U.S. Appl. No. 13/495,505, dated Apr. 10, 2013, 11 pgs.
Official Action for U.S. Appl. No. 13/495,505, dated Jul. 18, 2013, 21 pgs.
Membrane Support Fabrics: Issues and Un-Met Needs, Water Conditioning & Purification, by Edward C. Gregor, dated Feb. 2008, 2 pgs.
TriSep Engineering Manual, How a Spiral is Made, TriSep Corporation, date unknown, but admitted prior art, 2 pgs.
International Search Report and Written Opinion for PCT/US2013/042832, dated Jun. 27, 2013, 51 pgs.
Search Report and Written Opinion for PCT/US2013/068871, dated Feb. 28, 2014, 11 pgs.
Allowance Decision from the Intellectual Property Office for Taiwan App. No. 102141373, dated Mar. 31, 2016, with allowed claims, 10 pgs.
English abstract for EP1903134 (A1); downloaded from www.espacenet.com on Oct. 21, 2015; 2 pgs.
English abstract for EP 1041213(A1) corresponding to CN1270101(A); downloaded from www.espacenet.com on Oct. 21, 2015, 1 pg.
U.S. Appl. No. 13/495,505, filed Jun. 13, 2012.

* cited by examiner

*Primary Examiner* — Jenna Johnson
(74) *Attorney, Agent, or Firm* — Womble Carlyle Sandridge & Rice, LLP

(57) ABSTRACT

A permeate carrier fabric includes at least some monofilament synthetic yarns to provide adequate stiffness and reduce blockage of permeate flow.

24 Claims, No Drawings

PERMEATE CARRIER FABRIC FOR MEMBRANE FILTERS

PRIORITY

This application is a continuation-in-part of prior application Ser. No. 13/495,505, filed Jun. 13, 2012.

BACKGROUND OF THE INVENTION

This invention relates to permeate carrier fabrics for membrane filters, such as reverse osmosis filters, ultrafiltration filters and other types of membrane filters. Such filters are now in use in many applications for high-efficiency liquid filtration. Such membrane filters appear in spiral wound elements and are used with reverse osmosis filtration systems, microfiltration systems, nanofiltration systems, as well as ultrafiltration systems.

As stated above, such membrane filters generally comprise spiral wound elements made of three components, the membrane, the permeate carrier fabric, and the feed spacer. The membrane is the part of the element where the separation occurs and can be either a reverse osmosis, nanofiltration, ultrafiltration, or microfiltration type membrane. The feed spacer, on the other hand, separates two adjacent membrane faces and acts as a spacer and also a turbulence promoter. The permeate carrier fabric is placed between layers of the membrane and acts as a pipe to allow the permeate to flow between the adjacent membranes and exit from the element. A composite is made which consists of a first membrane layer, an intermediate permeate carrier fabric, and a second membrane layer. These three components are glued or sonically welded together on three sides, and numerous layers of these three-part composites are each glued around a perforated filter core. The spacer fabric is used between each layer of composite. The layers are rolled around the core to a certain diameter based on the size/diameter of the filter. This element is then placed in a cylindrical container.

As stated above, the purpose of the permeate carrier fabric is to provide direction for and channel the flow of the liquid. It is therefore important that the yarns in the fabric be sufficiently stiff or firm to prevent collapse.

The permeate carrier fabric is generally a knitted polyester tricot fabric. This fabric, as stated above, is placed between permeable membranes. Tricot knitted fabric has been found to be a particular desirable structure for supporting the membrane material due to the porous knitted structure and raised rows of stitches which define between them long, continuous channels akin to corrugation through which the liquid being filtered flows. However, other types of fabric may also be used as the permeate carrier, including other types of knitted fabric or even, woven fabric. The permeate carrier fabric should have a low pressure drop (high permeability) for the permeate flow while being able to withstand the high pressures exerted by the liquid being filtered without compaction.

In the past, there have generally been two types of permeate carrier fabrics. One type are knit fabrics of multifilament polyester yarns, which yarns are then coated with a resin to add firmness to the fabric. The other type of permeate fabric are fabrics made with bi-component yarns having a regular polyester core and a low melt polyester sheath. This sheath part of the yarn is melted during finishing to give the yarn its necessary firmness. Resin applied to add firmness to the resin coated yarns also tends to partially block the fabric channels thereby restricting part of the permeate flow. When the yarns in the bi-component fabrics are melted, again, the same result occurs, the channels are again partially blocked restricting the permeate flow.

SUMMARY OF THE INVENTION

The inventors here then have determined there is a need for a permeate carrier fabric which will be sufficiently stiff and firm to withstand the filter pressure without collapsing, however will reduce blockage of the permeate flow caused by resin needed in the past to provide the necessary firmness. The use of monofilament yarns in place of bi-component or resin coated multifilament yarns will reduce the resin and give the permeate carrier fabric exceptional firmness with improved flow. A "monofilament" yarn, as used herein, is to be distinguished from a bi-component yarn having a core and sheath and is intended to mean a single, relatively thicker filament yarn that is uncoated and unsheathed. An example is fishing line. Since monofilament yarns used in the permeate carrier fabric are sufficiently firm, the monofilament yarns do not need to be coated or physically changed, and the permeate channels will be wider for better flow. The permeate carrier fabric comprising at least some monofilament polyester (or nylon) yarns will be used as a channeling fabric between two layers of the membrane. It is important that the yarns forming the channels in the fabric be firm enough to withstand the filter pressure without collapsing. The addition of a monofilament yarn provides the necessary firmness needed to withstand filter pressure conditions.

Such a permeate carrier fabric optimizes the design, cost and efficiency of the finished filter. As a result of the monofilament yarns used in the permeate carrier fabric, there is less further processing required, a firmer permeate carrier fabric results, with a lower cost, and the channels in the fabric are wider for better permeate flow.

It is therefore one aspect of the invention to provide a permeate carrier fabric that comprises at least some monofilament yarn ends in polyester or nylon and the monofilament yarn size is at least 10 denier. The permeate carrier fabrics according the present invention may have varying wale counts, thickness, and weights. They may be made with (a) 100% monofilament yarns, (b) monofilament yarns and other spun or multifilament yarns, or (c) monofilament yarns partnered with some bi-component yarns. It is possible that a manufacturer might want to use a small amount of resin with either embodiment (a) or (b) to prevent yarn slippage or to make further processing of a composite or filter easier. However, these would be only small amounts of resin, significantly less than used in the coating processes of prior approaches.

DESCRIPTION OF A PREFERRED EMBODIMENT

While the permeate carrier fabric of the present invention may be knit or woven, the preferred approach is a warp knit, preferably tricot, in which at least one of the yarns is a monofilament yarn of between 10 and 40 denier. The wale and course count may vary based on filter performance, but the wale count should be between 20 and 70 per inch and the course count should also be between 20 and 70 courses per inch. The monofilament yarn is preferably formed of polyester, but could possibly be nylon. Where the fabric is made on a warp knitting machine, the machine may be either a 2, 3, or 4 bar machine.

The monofilament concept can be present in a range of fabrics including (1) 100% monofilament yarns, (2) monofilament yarns and other spun or multi-filament yarns, or (3) monofilament yarns partnered with bi-component yarns, where the machine is a 2 bar, 3 bar, or 4 bar machine, one or more of the bars could carry the monofilament yarn and the other bar(s) could carry the other type yarn. Where monofilament yarns are used without bi-component yarns, a small amount of resin may be added to the knit fabric. The resin is provided in order to prevent sliding or slipping of yarns with respect to one another. The amount of resin is insufficient to provide significant additional rigidity or support to the fabric.

Example 1

A trial sample of permeate carrier fabric was prepared using a combination of (1) 70 denier 24 filament bi-component, polyester yarn ends and (2) 20 denier monofilament polyester yarn ends. The bi-component yarn ends were set up on the top bar of a 2 bar tricot knitting machine and the monofilament yarn ends were set up on the bottom bar of the machine. The top bar used a 2/3, 1/0 pattern and the lower bar used a 1/0, 1/2 pattern. Each beam included 1,340 ends with final fabric targets of 60 wales per inch, 50 courses per inch and a weight of 3.87 ounces per square yard. The resulting fabric was spit into two 40" panels and weighed 4.16 ounces per square yard.

Example 2

A second trial fabric was made using the same yarns as Example 1 but the finished fabric targeted a wale count of 46 wales per inch. The resulting fabric weighed 3.23 oz/yd$^2$.

Example 3

A third trial fabric was made; again using the same yarns as Example 1, but the set-up used a targeted wale count of 35 wales per inch. The resulting fabric had a weight of 2.45 oz/yd$^2$.

Example 4

Another trial run was conducted using a slightly different multi-filament yarn in the fabric. In this example, the multi-filament yarn was 50 denier 24 filament bi-component polyester yarn. Otherwise, the setup was the same. In this example, the resulting fabric weighed 3.07 ounces/yard square.

Test 1

A test was run in which the fabric of Example 1 was pressure tested against a conventional tricot knitted fabric formed with all 70 denier 24 filament bi-component polyester and 50 denier 24 filament bi-component polyester. The 70 denier yarns ends were set up on the top beams of a tricot knitting machines in which the top bar used a 2/3, 1/0 patters, and the 50 denier yarn ends were set up on the bottom bar using a 1/0, 1/2 pattern. The two fabrics were placed between adjacent reverse osmosis membranes and tested at various water pressures. The lateral permeability of the two fabrics were measured at pressure differentials; and the fabric of Example 1 showed an improvement in permeability of approximately 30% depending on the pressure differential applied. The two samples were both effective to support the membranes.

We claim:

1. A permeate carrier fabric for placement between adjacent filter membranes of reverse osmosis, nanofiltration, ultrafiltration, or microfiltration systems, comprising:
    a) at least some monofilament synthetic yarn ends selected from the group consisting of polyester and nylon,
    b) the monofilament synthetic yarn being between 10 and 40 denier,
    c) whereby the permeate carrier fabric is a tricot knit fabric formed of the monofilament synthetic yarn, the tricot knit fabric having raised rows of stitches that form continuous channels along a face of the fabric for flow of fluid being filtered by the adjacent filter membranes; and
    d) whereby the permeate carrier fabric is configured to support adjacent filter membranes while reducing the blockage of permeate flow.

2. The permeate carrier fabric of claim 1 in which the permeate carrier fabric is formed of substantially 100% monofilament polyester yarns.

3. The permeate carrier fabric of claim 1 in which the permeate carrier fabric is formed of monofilament polyester yarns and other yarns.

4. The permeate carrier fabric of claim 1 in which the permeate carrier fabric is formed of monofilament polyester yarns and bi-component yarns.

5. The permeate carrier fabric of claim 4 in which the monofilament polyester yarns are 20 denier and the bi-component yarns are 70 denier 24 filament bi-component polyester yarn ends.

6. The permeate carrier fabric of claim 5, further comprising between 20 and 70 wales per inch and between 20 and 70 courses per inch.

7. The permeate carrier fabric of claim 1 in which the permeate carrier fabric is formed with multifilament polyester yarns and monofilament polyester yarns, and the monofilament polyester yarns are 20 denier.

8. The permeate carrier fabric of claim 7 in which the wale count is between about 20 and about 70 per inch and the course count is between about 20 and about 70 per inch.

9. A composite for use in a filter of the type used for reverse osmosis, nanofiltration, ultrafiltration or microfiltration, comprising:
    a) a first filter membrane layer and a second filter membrane layer; and
    b) a permeate carrier fabric, separate from, but supporting and separating the first and second filter membrane layers, the permeate carrier fabric comprising:
        i) at least some monofilament synthetic yarn ends selected from the group consisting of polyester and nylon,
        ii) the monofilament synthetic yarn being between 10 and 40 denier,
        iii) whereby the permeate carrier fabric is a tricot knit fabric formed of the monofilament synthetic yarn, the tricot knit fabric having raised rows of stitches that form continuous channels along a face of the fabric for flow of fluid being filtered by the first and second filter membrane layers; and
        iv) whereby the permeate carrier fabric is configured to support adjacent filter membranes while reducing the blockage of permeate flow.

10. The composite of claim 9 in which the permeate carrier fabric is formed of substantially 100% monofilament polyester yarns.

11. The composite of claim 9 in which the permeate carrier fabric is formed of monofilament polyester yarns and other yarns.

12. The composite of claim 9 in which the permeate carrier fabric is formed of monofilament polyester yarns and bi-component yarns.

13. The composite of claim 12 in which the monofilament polyester yarns are 20 denier and the bi-component yarns are 70 denier 24 filament bi-component polyester yarn ends.

14. The composite of claim 13 in which the permeate carrier fabric further comprises between 20 and 70 wales per inch and between 20 and 70 courses per inch.

15. The composite of claim 9 in which the permeate carrier fabric is formed with multifilament polyester yarns and monofilament polyester yarns, and the monofilament polyester yarns are 20 denier.

16. The composite of claim 15 in which the wale count is between 20 and 70 per inch and the course count is between 20 and 70 per inch.

17. A filter of the type used for reverse osmosis, nanofiltration, ultrafiltration or microfiltration, comprising:
   a) a composite, the composite comprising:
      a first filter membrane layer;
      a second filter membrane layer; and
      a permeate carrier fabric, separate from but supporting and separating the first and second filter membrane layers; and
   b) a feed spacer disposed adjacent to the composite, wherein the composite and the feed spacer are spiral wound around a core such that the feed spacer is disposed between adjacent filter membrane layers of the composite,
   wherein the permeate carrier fabric further comprises:
      i) at least some monofilament synthetic yarn ends selected from the group consisting of polyester and nylon,
      ii) the monofilament synthetic yarn being between 10 and 40 denier,
      iii) whereby the permeate carrier fabric is a tricot knit fabric formed of the monofilament synthetic yarn, the tricot knit fabric having raised rows of stitches that form continuous channels along a face of the fabric for flow of fluid being filtered by the first and second filter membrane layers; and
      iv) whereby the permeate carrier fabric is configured to support adjacent filter membranes while reducing the blockage of permeate flow.

18. The filter of claim 17 in which the permeate carrier fabric is formed of substantially 100% monofilament polyester yarns.

19. The filter of claim 17 in which the permeate carrier fabric is formed of monofilament polyester yarns and other yarns.

20. The filter of claim 17 in which the permeate carrier fabric is formed of monofilament polyester yarns and bi-component yarns.

21. The filter of claim 20 in which the monofilament polyester yarns are 20 denier and the bi-component yarns are 70 denier 24 filament bi-component polyester yarn ends.

22. The filter of claim 21 in which the permeate carrier fabric further comprises between 20 and 70 wales per inch and between 20 and 70 courses per inch.

23. The filter of claim 17 in which the permeate carrier fabric is formed with multifilament polyester yarns and monofilament polyester yarns, and the monofilament polyester yarns are 20 denier.

24. The filter of claim 23 in which the wale count is between about 20 and about 70 per inch and the course count is between about 20 and about 70 per inch.

* * * * *